United States Patent [19]

Lombardo et al.

[11] 4,390,484

[45] Jun. 28, 1983

[54] METHODS FOR PROMOTING THE FORMATION OF MICROPARTICLES

[75] Inventors: Igino Lombardo, Sharon; Peter J. Natale, Canton, both of Mass.

[73] Assignee: Ortho Diagnostics, Inc., Raritan, N.J.

[21] Appl. No.: 401,671

[22] Filed: Jul. 26, 1982

Related U.S. Application Data

[62] Division of Ser. No. 258,714, Apr. 29, 1981, Pat. No. 4,375,347.

[51] Int. Cl.³ .................................................. B01J 2/06
[52] U.S. Cl. .................................................. 264/9
[58] Field of Search .................................................. 264/9

[56] References Cited

U.S. PATENT DOCUMENTS

| | | |
|---|---|---|
| 4,251,195 | 2/1981 | Suzuki et al. ............... 264/9 |
| 4,279,632 | 7/1981 | Frosh et al. ............... 264/9 |
| 4,302,166 | 11/1981 | Fulwyler et al. ............... 264/9 |

*Primary Examiner*—James R. Hall
*Attorney, Agent, or Firm*—Mark A. Hofer

[57] ABSTRACT

Latex material disposed in a solvent is injected into a sheath fluid into which the solvent is soluble, but the latex is not. The solvent being jetted from a vibrating nozzle forms droplets within the flowing sheath, which is then delivered onto an inclined hydrophobic surface reposing at a low angle to the jet. As the droplet containing stream strikes and flows down the surface, its velocity is taken up as the phase separation process for forming microparticles begins.

4 Claims, 2 Drawing Figures

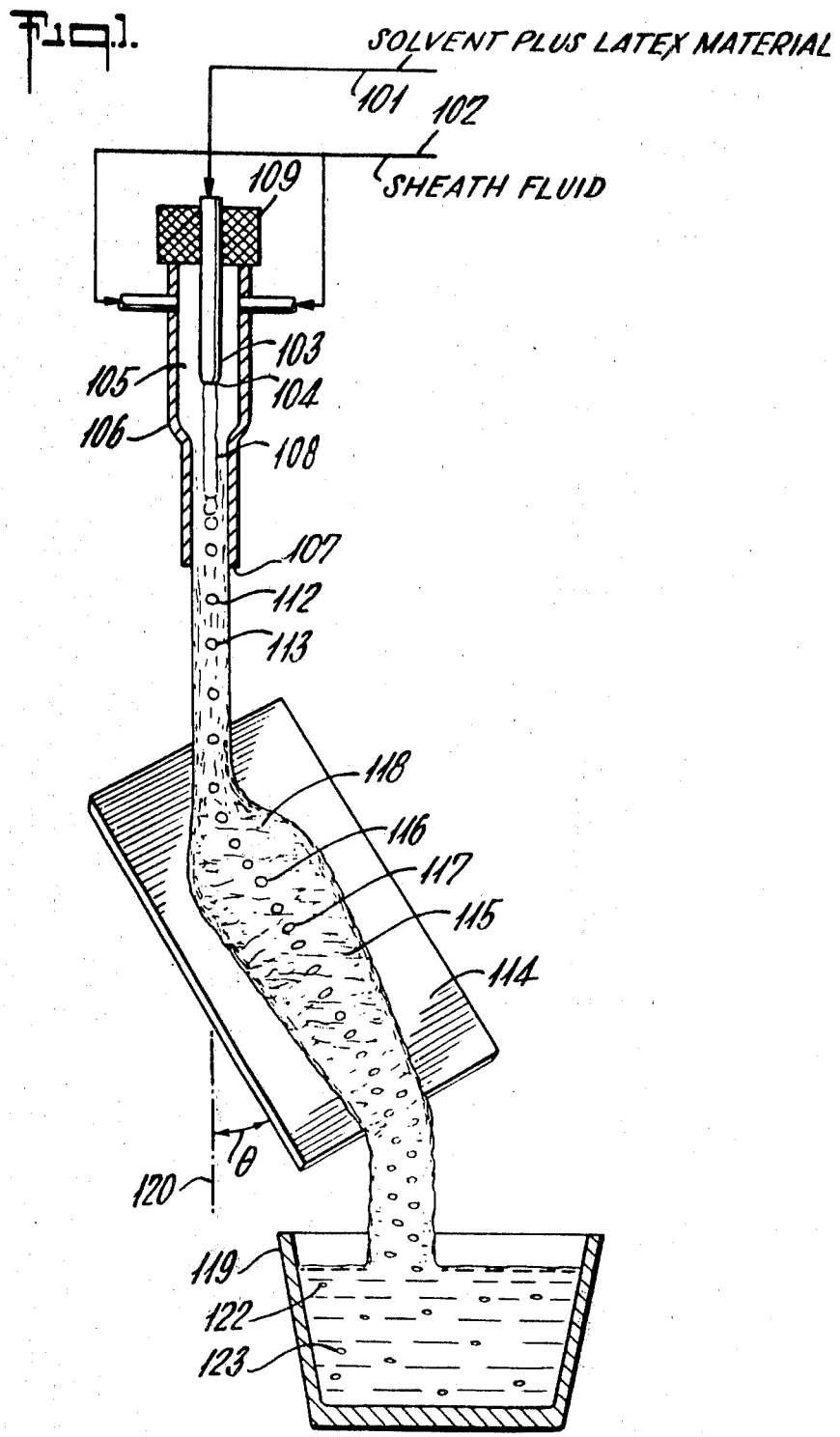

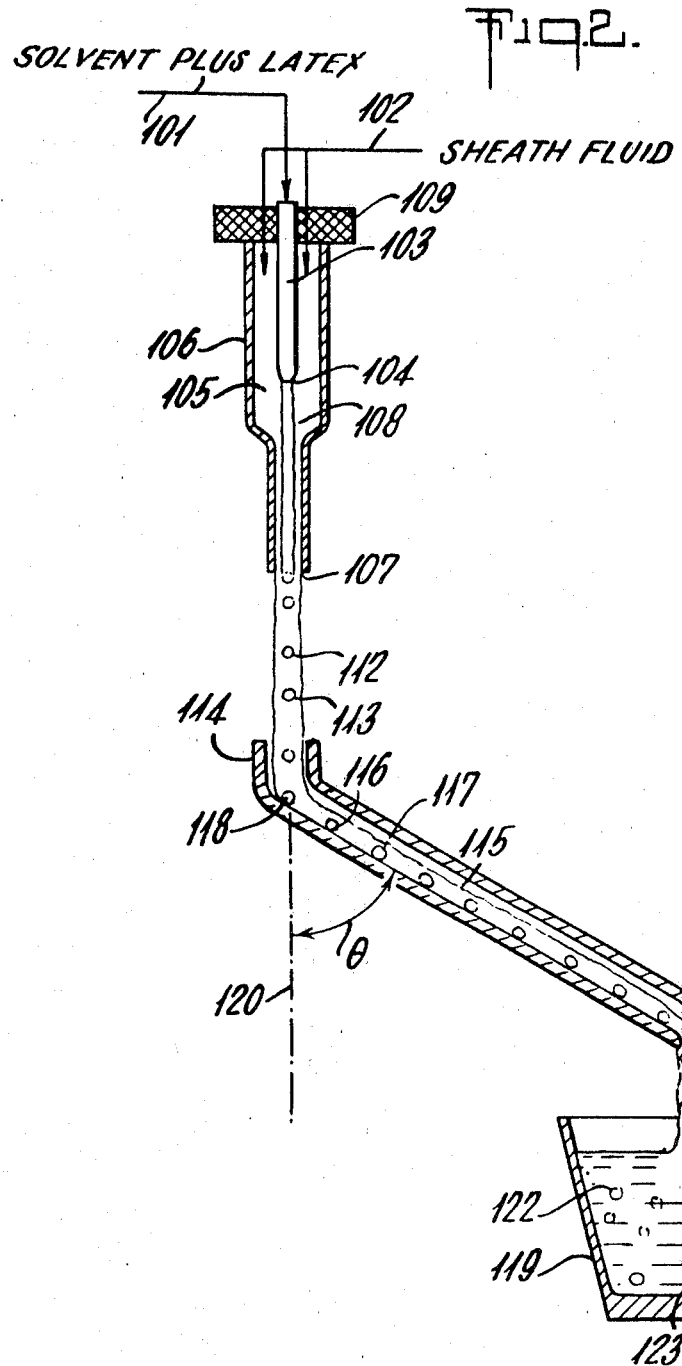

METHODS FOR PROMOTING THE FORMATION OF MICROPARTICLES

This application is a divisional application of copending application Ser. No. 258,714 entitled APPARATUS FOR PROMOTING THE FORMATION OF MICROPARTICLES, filed Apr. 29, 1981, now issued as U.S. Pat. No. 4,375,347, and which is fully incorporated herein by reference.

FIELD OF THE INVENTION

This invention relates to the formation of microparticles, and more particularly to methods for promoting formation of such microparticles from droplets by utilizing the phase separation method.

BACKGROUND OF THE INVENTION AND PRIOR ART

In accordance with the phase separation method of particle production, for example, for production of latex particles, the latex material is disposed in a solvent, which in turn is suspended in droplets in a fluid bath. The solvent and bath materials are chosen such that the solvent is slightly soluble in the fluid bath material, but the latex is essentially insoluble in the bath. Thus, as solvent diffuses into the fluid bath material, the latex is continuously redistributed and concentrated. When all of the solvent has diffused out of the latex droplets, a solid latex particle remains, the size of which depends on the amount of latex material in the original droplet.

The prior art teaches numerous methods whereby the droplets of solvent used in the phase separation process are sized and processed such that particles of corresponding size and precision will be produced. For particles in the range of two to five micrometers in diameter and above (for example, to fifty to ninety micrometers or more), most prior art methods fail to assure a precision within 5% of the desired diameter.

It is an object of the present invention to provide in principle methods for producing microparticles in the range from approximately two to one hundred micrometers in diameter, at a degree of precision substantially better than the 5% tolerances demonstrated by most of the prior art.

The prior art does, however, teach at least one method which purports to produce monodispersed particles in the desired size ranges at a precision of at least 2% by volume. This method is described by M. J. Fulwyler et al. in an article entitled "PRODUCTION OF UNIFORM MICROSPHERES," Review of Scientific Instruments 44, 1973. Similar techniques are set forth in U.S. Pat. No. 4,162,282 to Fulwyler et al. entitled "METHOD FOR PRODUCING UNIFORM PARTICLES," issued July 24, 1979, from an application filed Apr. 22, 1976. These techniques are based on synchronized droplet formation principles first investigated by Lord Rayleigh in the nineteenth century to disintegrate a jet of solvent material contained within a sheath fluid, the solvent being soluble in the sheath fluid. In accordance with the Fulwyler et al. techniques, a core liquid is injected into a moving sheath liquid. When combined, sheath and core are together formed into biphasic droplets as the fluids are jetted from a vibrating nozzle. The droplets are collected, and by stirring are held suspended in a catch liquid until the core and the sheath liquids from each droplet have diffused into the catch liquid, leaving particles formed of the materials which were dispersed within the core.

It has been found that, in accordance with the Fulwyler et al. methods, the mechanism by which the fast-moving droplets are collected and stirred is an important, and indeed critical mechanism for the formation of uniform particles. The fast flowing sheath of fluid forms biphasic droplets which have considerable kinetic energy and momentum; depending on droplet size and velocity, there exists a varying degree of risk, nearly always substantial, that the droplets will experience shear forces of such intensities that they are broken apart during the collection process.

Utilization of the teachings of Fulwyler et al. to generate high precision microparticles on a time sustained basis therefore necessitates very substantial design compromises. Most basically, avoidance of particle breakup mitigates in favor of relatively large sheath-to-core diameter ratios, and the employment of relatively large, expensive, and ultimately wasteful amounts of sheath and catch fluids in order to generate a relatively small amount of particles. Moreover, regulation of the sheath-to-core ratio by reducing the diameter of the core injection nozzle tends to promote clogging unless the overall particle production rate is substantially decreased. Additionally, Fulwyler also must resort to application of a similar charge to each droplet to prevent coalescing during the formation process.

Primary objects of the present invention therefore include the utilization of the core/sheath approach, as taught by Fulwyler, but at faster rates, employing substantially reduced sheath and catch liquid volumes, eliminating the need for droplet charging, and employing respective nozzle sizes which obviate the danger of frequent clogging.

DISCLOSURE OF THE INVENTION

In accordance with the principles of the present invention, a core/sheath laminar flow approach is utilized, in conjunction with a vibrating nozzle droplet formation. The velocity and momentum of the droplets and surrounding sheath liquid are mechanically but safely taken up during the onset of the phase separation process, but prior to ultimate collection of the forming and partially formed microparticles.

In accordance with the principles of the present invention, the momentum of the sheath stream and core fluid droplets is transferred to a surrounding medium in the presence of shear forces low enough not to cause breakage of droplets. In an illustrative embodiment, the microdroplet jet containing sheath fluid is directed onto and down a hydrophobic surface inclined at a very low angle (e.g. 1 to 10 degrees) relative to the inclination of the jet. Kinetic energy of the sheath stream and core droplets is lowered by transfer of momentum to the hydrophobic surface, and, to a lesser extent, by frictional loss between the droplet flow and the surface.

In accordance with the principles of the present invention, the rate of momentum transfer is controllable by adjustment of the jet to surface angle, and by selection of the type and quality of the hydrophobic surface. In a preferred embodiment, the hydrophobic surface is a substantially smooth surface of F.E.P. (fluoroethylenepropylene), disposed at an angle of 3 to 5 degrees relative to the incident jet.

It is a feature of the principles of the present invention that microparticles are generated at a rate of 25 kiloherz, sized in the range of 2 to about 100 micrometers at a precision in the range of or better than 2%, utilizing a 50 micrometer core nozzle and a sheath volume which is vastly reduced from that called for by the prior art.

DESCRIPTION OF DRAWINGS

FIGS. 1 and 2, attached, show illustrative embodiments of the principles of the present invention.

BEST MODE FOR CARRYING OUT THE INVENTION

FIGS. 1 and 2, attached, show alternative views and forms of the principles of the present invention. That is, FIG. 1 shows an isometric view employing a flat hydrophobic surface 114, whereas, FIG. 2 shows a lateral cutaway employing a tubular hydrophobic surface 114. In other respects, the embodiments are identical, and as used herein the term "surface 114" shall be used for collection surfaces of either configuration, as well as other variants and equivalents thereof.

Referring to the attached drawing, there is shown in stylized form a preferred embodiment of the principles of the present invention. As shown in the drawings, a core liquid, for example an organic solvent containing dissolved latex material, is coupled from a supply via supply line 101 to an injection conduit 103. A sheath fluid is coupled from a supply via supply line 102 to a flow channel 106. As is known in the art, the sheath fluid 105 in flow channel 106 and the injected core 108 from opening 104 are joined together under laminar flow conditions by regulation of the control of volume and pressure from the respective supplies 101 and 102. Hence, at nozzle 107 the sheath fluid and core droplets are uniformly, coaxially jetted into the air.

As is also known in the art, a piezoelectric transducer 109 vibrates the injection conduit 103 and thereby periodically disturbs the flow of the jetting core liquid 108 as it emerges from the opening 104, forming droplets 112, 113, etc. The size of the droplets 112 and 113, are established, as is known in the art, by the size of opening 104, the sheath flow rate and volume, the core flow rate and volume, and the periodicity of the vibration of conduit 103 as established by the transducer 109.

In accordance with the principles of the present invention, a stream containing droplets is jetted from the nozzle 107 onto an inclined hydrophobic surface 114, along which it flows and hence is slowed down as the particle forming phase separation begins. The angle $\theta$ between surface 114 and the incidence plane 120 of the exiting stream containing droplets is vastly exaggerated in the drawings for purposes of explanation. In accordance with the principles of the present invention, the angle $\theta$ will vary between one and ten degrees, with the preferred range being substantially between three and five degrees.

The flow of the droplets such as 116 and 117 is also vastly exaggerated in the drawings, with the fluid jacket 115 symbolically representing a virtually continuous fluid flow of constituent droplets along the surface 114. In accordance with the principles of the present invention, the droplet containing jet from nozzle 107 impacts upon surface 114 at the point 118, and thence flows downwardly along 114, at which time much of the momentum of the droplets such as 116 is transferred to the surface 114. As the droplets and sheath fluid flow along surface 114, they are also slowed by virtue of friction forces engendered by the hydrophobic surface 114. During such time, the phase separation is occurring, and much of the particle "setting" has occurred by the time droplets run from the surface 114 into a collection vessel 119. By the time the particles are collected as runoff in the collection vessel 119, for example particles 122 and 123, they are, although not completely formed, but are sufficiently formed that no particular processing restrictions are entailed. That is, the careful stirring, and the like requirements exemplified in the prior art are obviated.

In accordance with preferred forms of the principles of the present invention, the hydrophobic surface 114 is composed of polymeric material such as FEP(fluoroethylene-propylene), or the material available under the trade name Teflon (tetra-fluoro-ethylene). Generally, it is desirable that the surface 114 be smooth rather than rough, thereby to obviate turbulence as the droplets impact upon, and run along the surface 114.

EXAMPLE OF THE USE OF THE INVENTION

The disclosed apparatus was used to produce uniform microspheres which contained a fluorescent dye. In this application, the core liquid consisted of an organic solvent existing of 20% methylene chloride and 80% dichloroethane containing dissolved poly(styrene-allyl alcohol) at a concentration of 2 mg/ml and a fluorescent dye at 0.25 mg/ml. The sheath fluid in this application consisted of an aqueous solution of 0.02% sodium lauryl sulfate.

The core liquid was maintained in a reservoir under 9 PSI of pressure and excruted through an orifice of 50 microns in diameter into the flowing sheath solution whose source was a second reservoir maintained under 12 PSI. At these pressures, the flow-rate of the core liquid was approximately 0.4 ml/min. and the sheath fluid approximately 23 ml/min.

The Piezo-electric transducer was operated at a frequency of 24.8 KHz.

The resulting sheath stream and core droplets were jetted through a 300 micron nozzle onto a 3° inclined FEP surface of approximately 11 centimeters in length. In the example being described a tubular apparatus was utilized although a flat surfce may also be employed for the deacceleration of droplets.

The resulting droplets were collected in an appropriate container and phase transfer or organic fluid into the aqueous phase allowed to occur.

In the example being described, phase transfer was facilitated by introducing a sodium chloride (0.85%) diluent at approximately 12 ml per minute into the collection vessel during the collection of the droplet/sheath suspension.

Once phase transition was complete, the formed microspheres were collected by filtration and resuspended in an appropriate suspension media.

The resulting microspheres had diameters of approximately 10 microns with coefficients of variation (CV's) as low as 0.55% depending upon the system of measurement.

The CV of fluorescence, which is likewise dependent upon the system of measurement in addition to the level of dye, in the example cited yielded 3.6%.

We claim:

1. A method for forming microparticles from a flowing stream of a core liquid ejected from the exit of a vibrating nozzle concurrently and coaxially into a flowing stream of a sheath liquid forming a composite liquid stream having a longitudinal axis, wherein droplets formed of said liquid within said sheath liquid stream are formed into microparticles, said method of forming microparticles comprising: transferring the momentum of said droplets to a hydrophobic material for generating shear forces which slow the droplets but which do not substantially rupture the droplets to thereby promote the formation of said microparticles from said droplets.

2. A method as described in claim 1 wherein said hydrophobic material is disposed beneath said liquid stream and upon which said composite liquid stream impinges to promote the formation of said microparticles, said surface being inclined at an angle of 1°–10° to said longitudinal axis of said composite liquid sheath and wherein said microparticles, upon contact with said inclined surface, encounter frictional force therewith which decreases the velocity of said droplets without substantially rupturing said droplets, to thereby promote the formation of said microparticles from said droplets.

3. A method as described in claim 1 wherein said hydrophobic material is selected from the group consisting of fluoroethylene propylene and tetrafluoroethylene.

4. A method as described in claim 1 further comprising collecting the microparticles, core liquid and sheath liquid after contact with said hydrophobic surface in a collection vessel.

* * * * *